United States Patent [19]

Miyano

[11] Patent Number: 5,532,752
[45] Date of Patent: Jul. 2, 1996

[54] CHARACTER IMAGE ENCODING/DECODING SYSTEM

[75] Inventor: Yuichi Miyano, Kanagawa-ken, Japan

[73] Assignee: Kabushiki Kaisha Toshiba, Kawasaki, Japan

[21] Appl. No.: 233,879

[22] Filed: Apr. 26, 1994

[30] Foreign Application Priority Data

Apr. 28, 1993 [JP] Japan .................................. 5-102042

[51] Int. Cl.⁶ .............................. H04N 5/445; H04N 7/08
[52] U.S. Cl. .......................... 348/468; 348/473; 348/586; 348/600; 345/144
[58] Field of Search ..................................... 348/465, 468, 348/473, 563, 564, 586, 600, 460, 474, 475; 345/114, 144, 194; H04N 7/08, 5/445

[56] References Cited

U.S. PATENT DOCUMENTS

| 4,044,380 | 8/1977 | Justice et al. | 348/460 |
|---|---|---|---|
| 4,105,998 | 8/1978 | Yoshida et al. | 340/146.3 |
| 4,358,790 | 11/1982 | Summers | 348/465 |
| 5,122,784 | 6/1992 | Canova | 345/114 |
| 5,293,235 | 3/1994 | Guede et al. | 345/144 |

FOREIGN PATENT DOCUMENTS

| 1248772 | 10/1989 | Japan | H04N 5/445 |
|---|---|---|---|
| 6113222 | 4/1994 | Japan | H04N 5/445 |

OTHER PUBLICATIONS

Chen et al., "A Binary Representation of Mixed Documents (Text/Graphic/Image) That Compresses", ICASSP 86 Proceedings, IEEE–IECEJ–ASJ Int'l. Conference on Acoustics, Speech & Signal Processing, 7–11 Apr. 1986, vol. 1, pp. 537–540.

Cabrelli, et al., "Automatic Representation of Binary Images", IEEE Transactions on Pattern Analysis & Machine Intelligence, Dec. 1990, vol. 12, No. 12, pp. 1190–1196.

Patent Abstracts of Japan, vol. 017, No. 223 (E–1359), 7 May 1993 & JP–A–04 356 873, 10 Dec. 1992.

Patent Abstracts of Japan, vol. 017, No. 422 (P–1586) 5 Aug. 1993 & JP–A–05 081 419, 2 Apr. 1993.

Patent Abstracts of Japan, vol. 017, No. 169 (E–1344) Mar. 1993 & JP–A–04 326 668 16 Nov. 1992.

Patent Abstracts of Japan, vol. 016, No. 420 (E–1259) 4 Sep. 1992 & JP–A–04 144 485 18 May 1992.

van der Meer, "The Full Motion System for CD–1", IEEE Transactions on Consumer Electronics, vol. 38, No. 4 Nov. 1992, pp. 910–920.

Primary Examiner—James J. Groody
Assistant Examiner—Jeffrey S. Murrell
Attorney, Agent, or Firm—Cushman, Darby & Cushman

[57] ABSTRACT

A character image encoding/decoding apparatus is provided with an encoder for encoding character data to a sub-picture with a bit-mapped shape of monochromic character data, separately from an encoding of a main picture, a detector for detecting bit changing positions in a two-dimensional manner from the bit-mapped shape of monochromic character data; an extractor for extracting a contour of the character data; and a developer for developing the character data, the contour and a background of the character data in three domains, respectively.

2 Claims, 6 Drawing Sheets

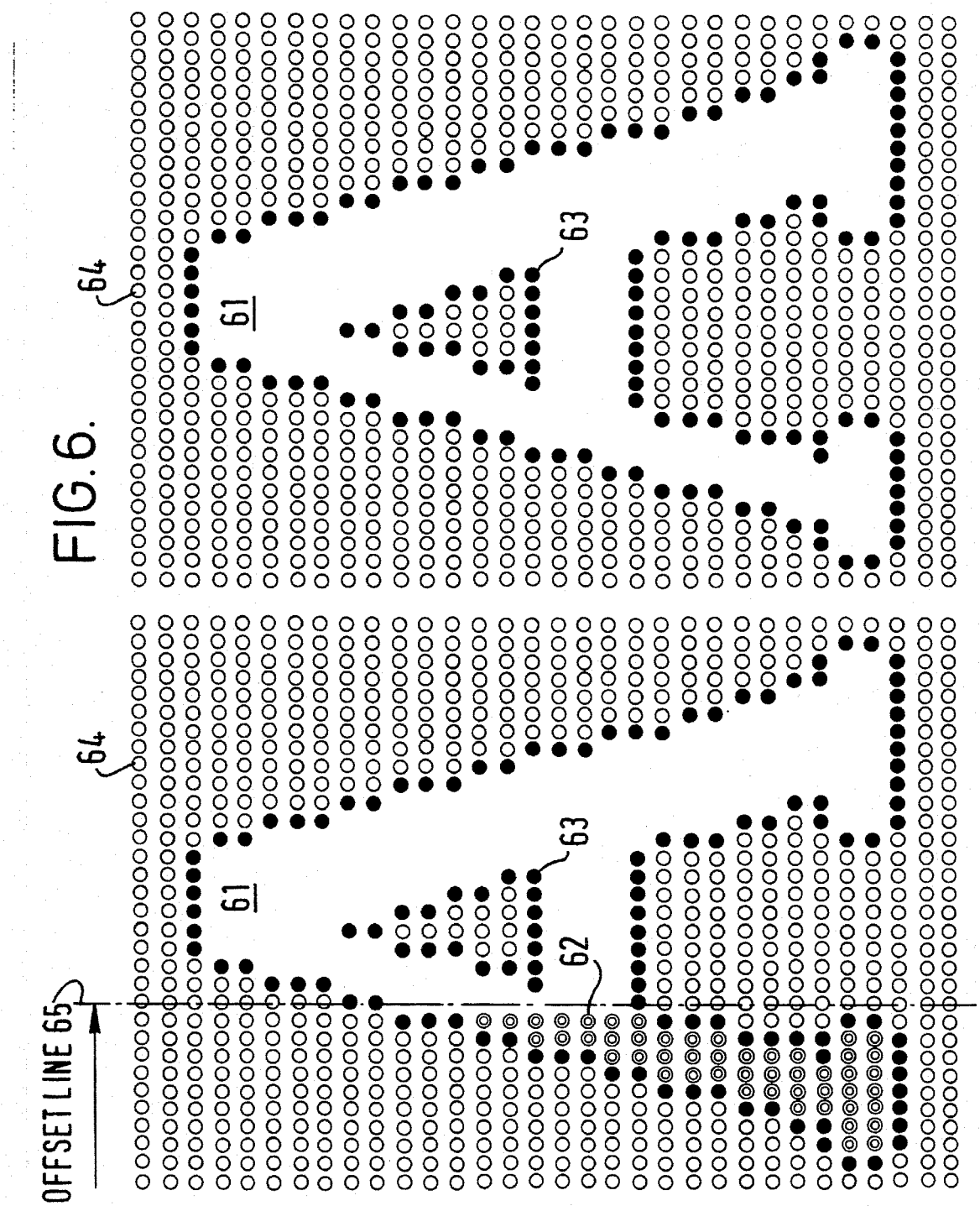

CHARACTER IMAGE ENCODING/DECODING SYSTEM

FIELD OF THE INVENTION

The present invention generally relates to an encoding/decoding system, and more particularly, to a character image encoding/decoding apparatus.

BACKGROUND OF THE INVENTION

In a conventional method for encoding a main picture comprised of video image data and a sub-picture comprised of only character information, such as captions superimposed on movie films, lyrics displayed on visual "karaoke" systems, telops displayed on TV screens, there is a method of encoding a sub-picture comprised of the character data after superimposing it onto a main picture comprised of video image data.

This encoding method does not require any special operation or circuit for displaying characters in a decoding operation and has no restriction on the shape or size of characters. It is possible to add decorations or other characters such as kana letters on or around the characters. However, in a low bit rate motion picture compression with a high data compression rate, deformations of the characters become conspicuous so that small characters become difficult to read. Furthermore, if one tries to reduce these deformations, the efficiency of the data compression deminishes.

Further, there is another encoding method which encodes a sub-picture using a code data format such as a format regulated by the Japanese Industrial Standard, separately from a main picture data. This encoding method has a feature that no deformation occurs in a decoded character, even when an image compression process has been applied to the character. However a character generator is necessary for displaying characters in its decoding operation, and the process of superimposing the sub-picture onto a main picture and the process of synchronizing them with each other have to be performed. In addition, the shape and size of the character are not flexible and it is not possible to display characters that cannot be generated by a character generator.

As described above, according to a conventional encoding system for a character image encoding/decoding apparatus, a method of encoding a sub-picture comprised of character data after superimposing it onto a main picture comprised of the video image data is used. However, the conventional method has a defect such that deformations of the characters become conspicuous so that small characters become difficult to read. Further, in a method for encoding character data using a code data format separately from a main picture, there are many restrictions on usable characters.

SUMMARY OF THE INVENTION

The present invention provides a character image encoding/decoding apparatus which is able to remove the defects in the conventional apparatus as described above.

The present invention also provides a character image encoding/decoding apparatus which is able to efficiently encode character information.

A character image encoding/decoding apparatus according to one aspect of the present invention includes a character data encoder, such as character encoder 14, for encoding character data as a sub-picture separately from an encoding of a main picture in a digital encoding/decoding operation of motion pictures, a detector for detecting bit changing positions in a two-dimensional manner from a bit-mapped simple shape of monochromic character data, processing means for extracting a contour of the character data and for developing the character data, the contour and a background of the character data in three domains, respectively, such as contouring processor 11.

In the apparatus constructed as described above, it is possible to efficiently encode character information by detecting bit changing positions in a two-dimensional manner from bit-mapped monochromic character data, then extract a contour of the character data and develop the character data, the contour and a background of the character data in three domains, respectively.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 6 is an explanatory diagram showing another example of the character bit-map patterns according to the present invention.

DESCRIPTION OF THE PREFERRED EMBODIMENTS

Figure 1:
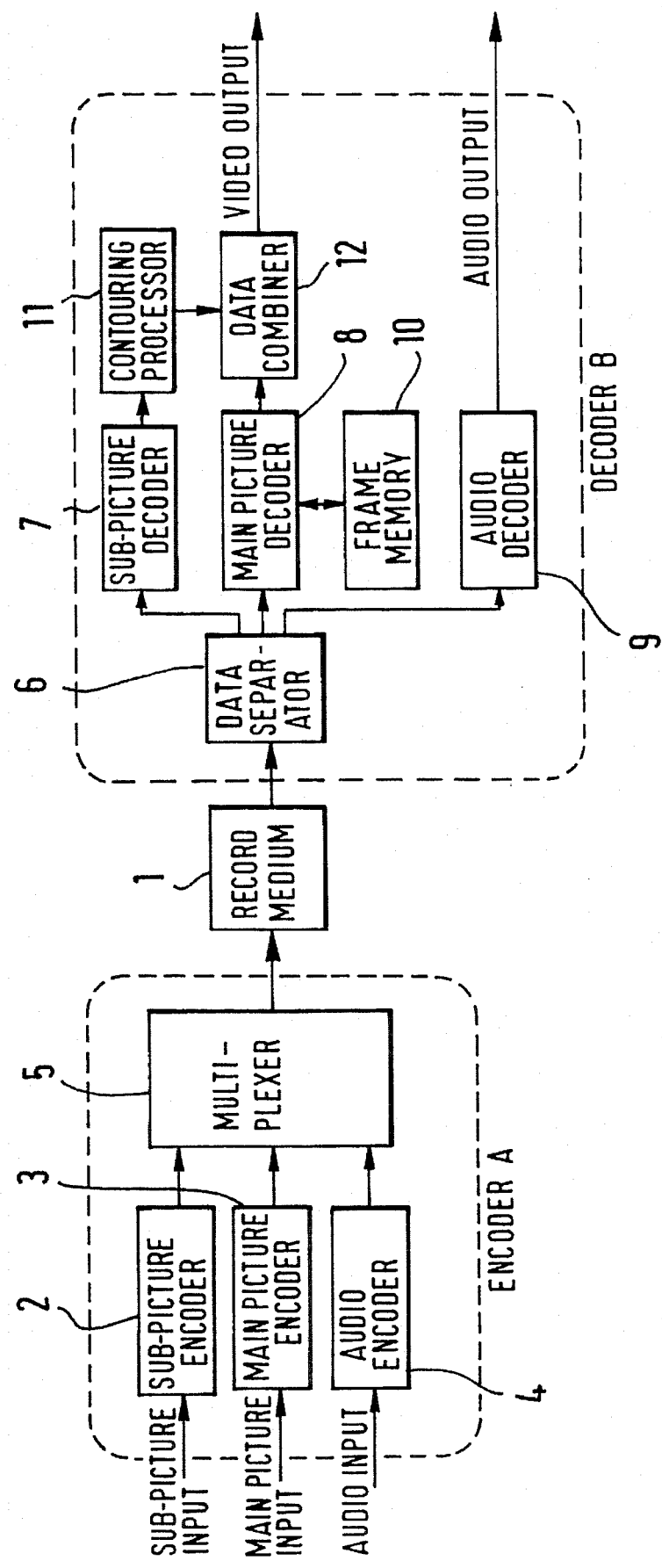
FIG. 1 is a block diagram showing a character image encoding/decoding apparatus according to a first embodiment of the present invention.

The present invention will be described in detail with reference to the FIGS. 1 through 6. Throughout the drawings, like or equivalent reference numerals or letters will be used to designate like or equivalent elements for simplicity of explanation.

Referring now to FIGS. 1 through 4, a first embodiment of the character image encoding/decoding apparatus according to the present invention will be described in detail.

FIG. 1 is a block diagram showing a character image encoding/decoding apparatus according to a first embodiment of the present invention. This apparatus is comprised of an encoder A, a record medium 1 such as a disc, and a decoder B. Reference numeral 2 denotes a sub-picture signal encoder for encoding input sub-picture signals such as characters, according to a run length encoding process. Reference numeral 3 denotes a main picture signal encoder for encoding input main picture signals according to the run length encoding process. Reference numeral 4 denotes an audio signal encoder for encoding input audio signals according to the run length encoding process. Reference numeral 5 denotes a multiplexer for combining the signals encoded by the sub-picture encoder 2, the main picture encoder 3 and the audio signal encoder 4 and then providing them to the record medium 1 as record data thereto.

Reference numeral 6 denotes a data separation circuit for separating a reproduced signal reproduced from the record medium 1 into a sub-picture signal, a main picture signal and an audio signal. Reference numeral 7 denotes a sub-picture decoder for decoding the sub-picture signal separated by the data separation circuit 6. Reference numeral 8 denotes a main picture decoder for decoding the main picture signal separated by the data separation circuit 6. Reference numeral 9 denotes an audio signal decoder for decoding the audio signal separated by the data separation circuit 6, and then outputting the signal as an output audio signal. Reference numeral 10 denotes a frame memory for temporarily encoding the main picture when decoding the main picture signal by the main picture decoder 8. Reference numeral 11 denotes a contouring processor for contouring the sub-picture decoded in the sub-picture decoder 8. Reference numeral 12 denotes a data combining circuit for combining the data from the main picture decoder 8 and the contouring processor 11 and outputting them as video signals.

Figure 2:
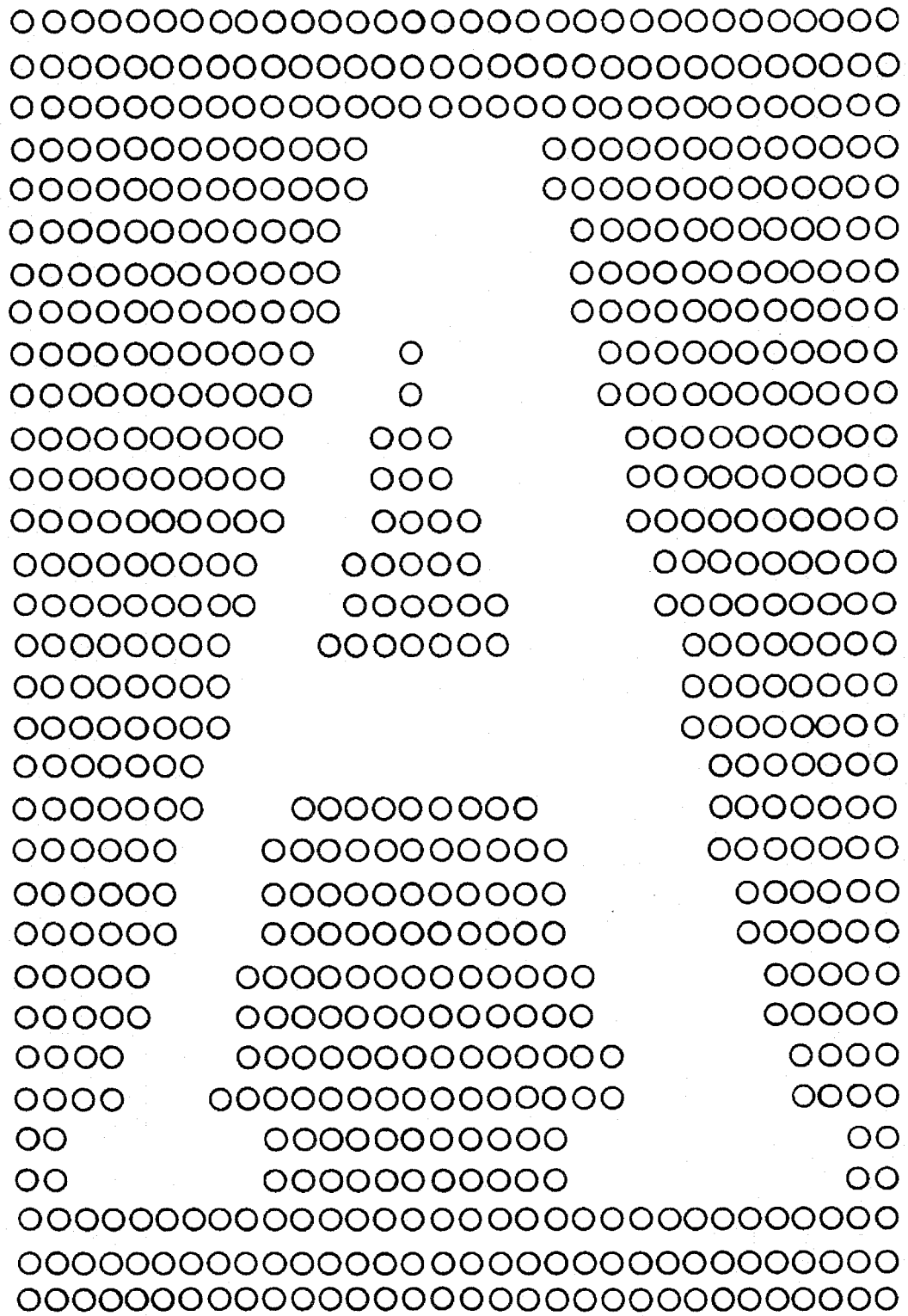
FIG. 2 is a diagram showing an exemplary character bit pattern for explaining the operation of the apparatus shown in FIG. 1.
Figure 3:
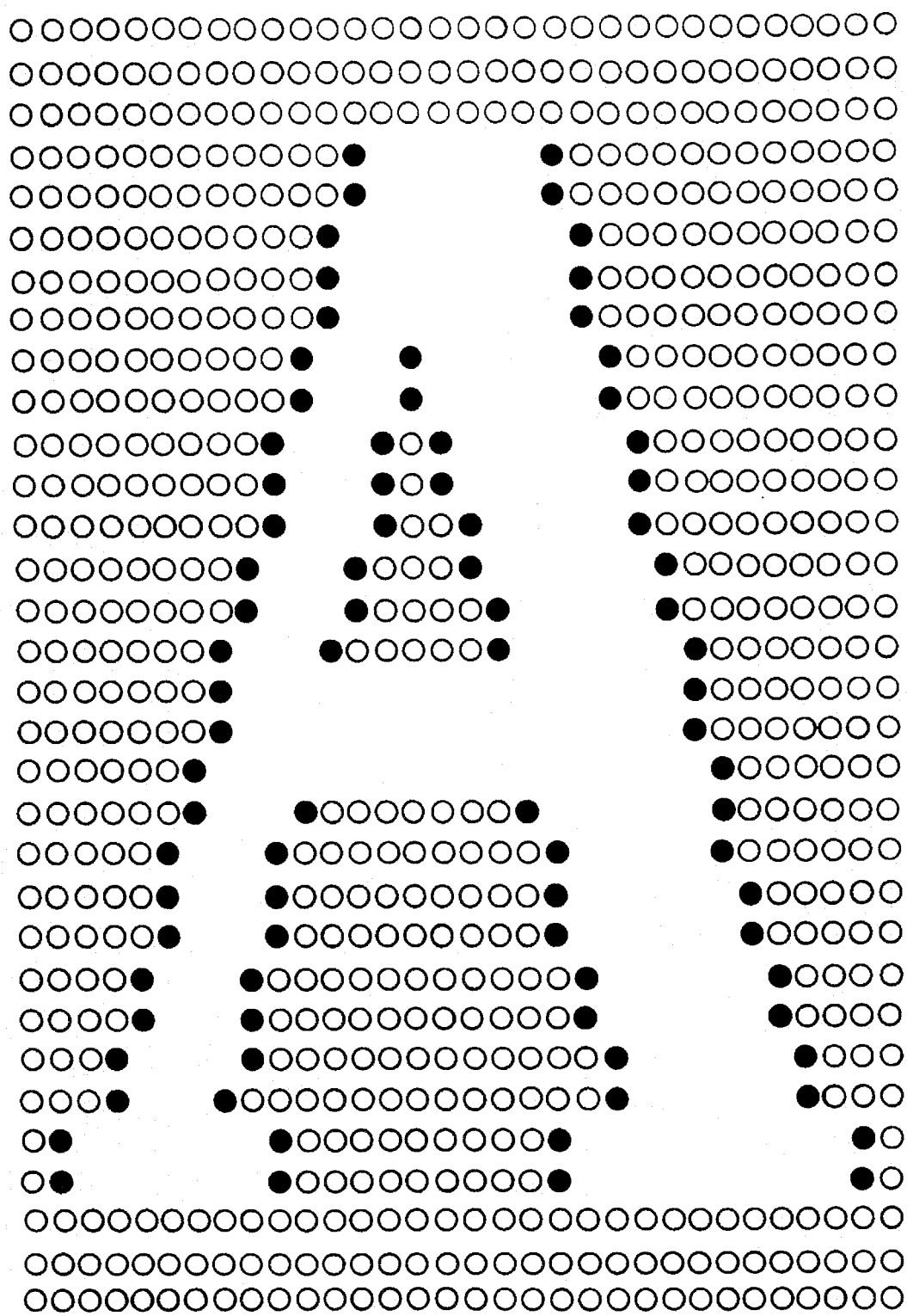
FIG. 3 is a character bit pattern diagram after processing the horizontal tracing on the character bit pattern of FIG. 2.

This embodiment will now be explained using a concrete example. FIG. 2 shows a character bit pattern included in sub-picture signals. In the sub-picture encoder 2, the reversible compression processing of input sub-picture signals is carried out according to the run length encoding.

The main picture signals and the audio signals are encoded in the main picture signal encoder 3 and the audio signal encoder 4, respectively, and are multiplexed by the multiplexer 5. The multiplexed signals are recorded as record data on the record medium 1 such as a disc.

The record data reproduced from the record medium 1 is separated into the sub-picture signal, the main picture signal and the audio signal by the data separation circuit 6. Then, these signals they are input into the sub-picture signal decoder 7, the main picture signal decoder 8 and the audio signal decoder 8, respectively. The encoded sub-picture data is decoded by the sub-picture signal decoder 7 and developed to a bit pattern which is the monochromic bit-map, as illustrated in FIG. 2.

The decoded sub-picture signal is input to the contouring processor 11. In this contouring processor 11, a character image of the monochromic bit pattern is traced in the horizontal direction to seek changing positions of the bit pattern, as shown by the black dots in FIG. 3. Where the bit-map of the scene changes to the bit-map of the character, the last bits on the background are marked as character contour bits through the horizontal direction seek process. Where the bit-map of the character changes to the bit-map of the scene, the last bits on the character are marked as the character contour bits through the horizontal direction seek process.

Figure 4:
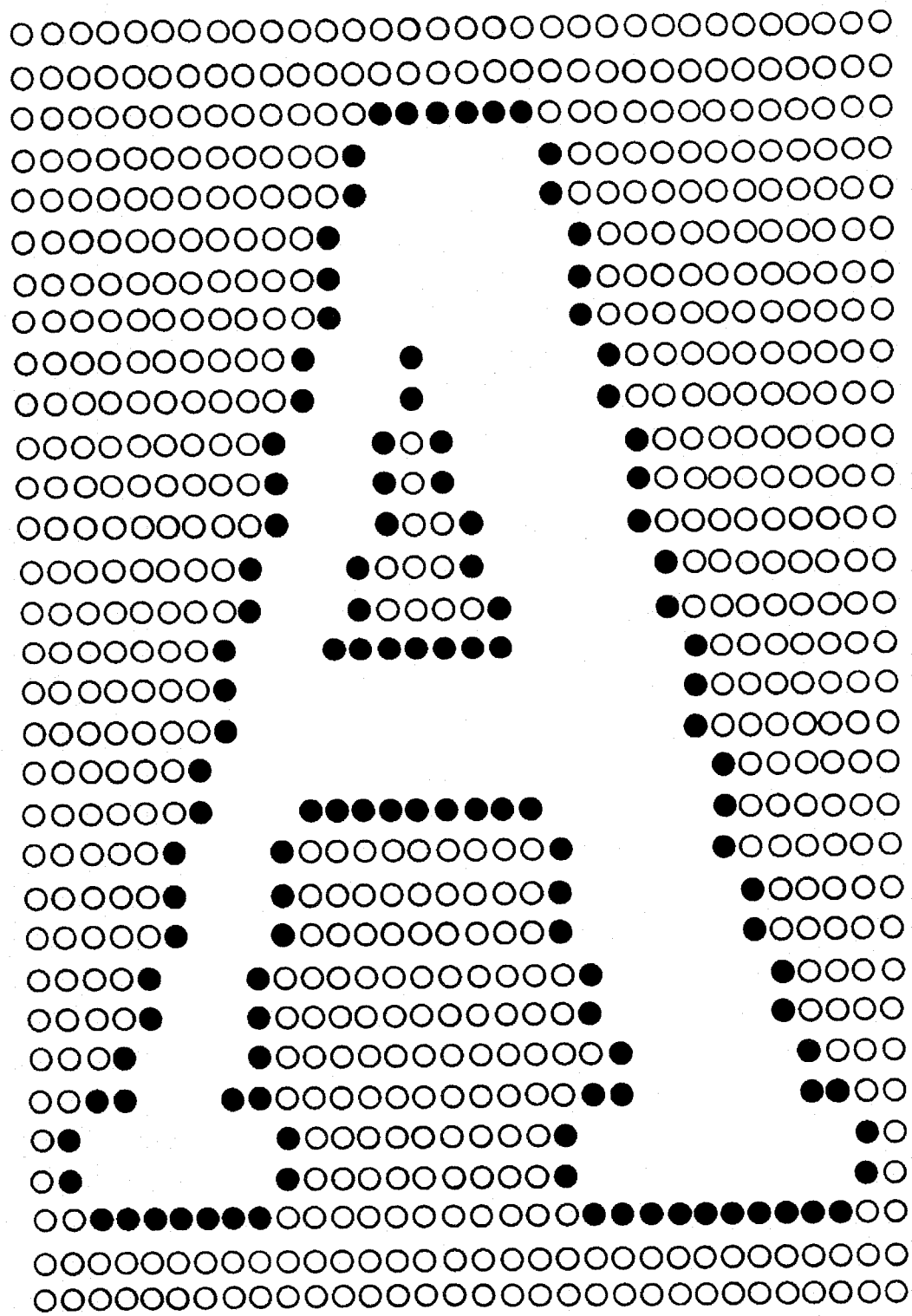
FIG. 4 is a character bit pattern diagram after processing the vertical tracing on the character bit pattern of FIG. 2.

The character image is then traced in the vertical direction to find the changing positions of the bit pattern, as shown by the black dots in FIG. 4. Where the bit-map of the background changes to the bit-map of the character, the last bits on the background are marked as character contour bits through the vertical direction seek process. Where the bit-map of the character changes to the bit-map of the background, the last bits on the character are marked as the character contour bits through the vertical direction seek process.

According to the horizontal and vertical direction seek processes as described above, it is possible to make a one-bit width contour line along the edge of the character image which originally has a simple shape, as illustrated by the black dot line in FIG. 4.

The contouring processed three-state sub-picture signal is input to a data multiplexing circuit 12 which multiplexes the sub-picture signal with the main picture signal decoded by the main picture decoder 8 and outputs the multiplexed signal as a video output.

The audio signal decoded by the audio signal decoder 9 is directly output from the decoder B as an audio signal output.

Since a character image requires a relatively long time for a user to read it, there is an upper limit for the image screen changing speed. Thus, in many cases, a general image screen changing time extends for several seconds. Therefore, a character image is not given for every frame of main pictures, rather one character image is attached to every multiple frames of main pictures. Here, every GOP (Group of Pictures) unit regulated in the MPEG (Motion Picture Expert Group) standard is used as a unit of main picture to which every character image is attached.

In this embodiment, while an encoded picture is binary data of a monochromic bit-map, a decoded image can be developed from three-state data through the contour sampling processing.

Figure 5:
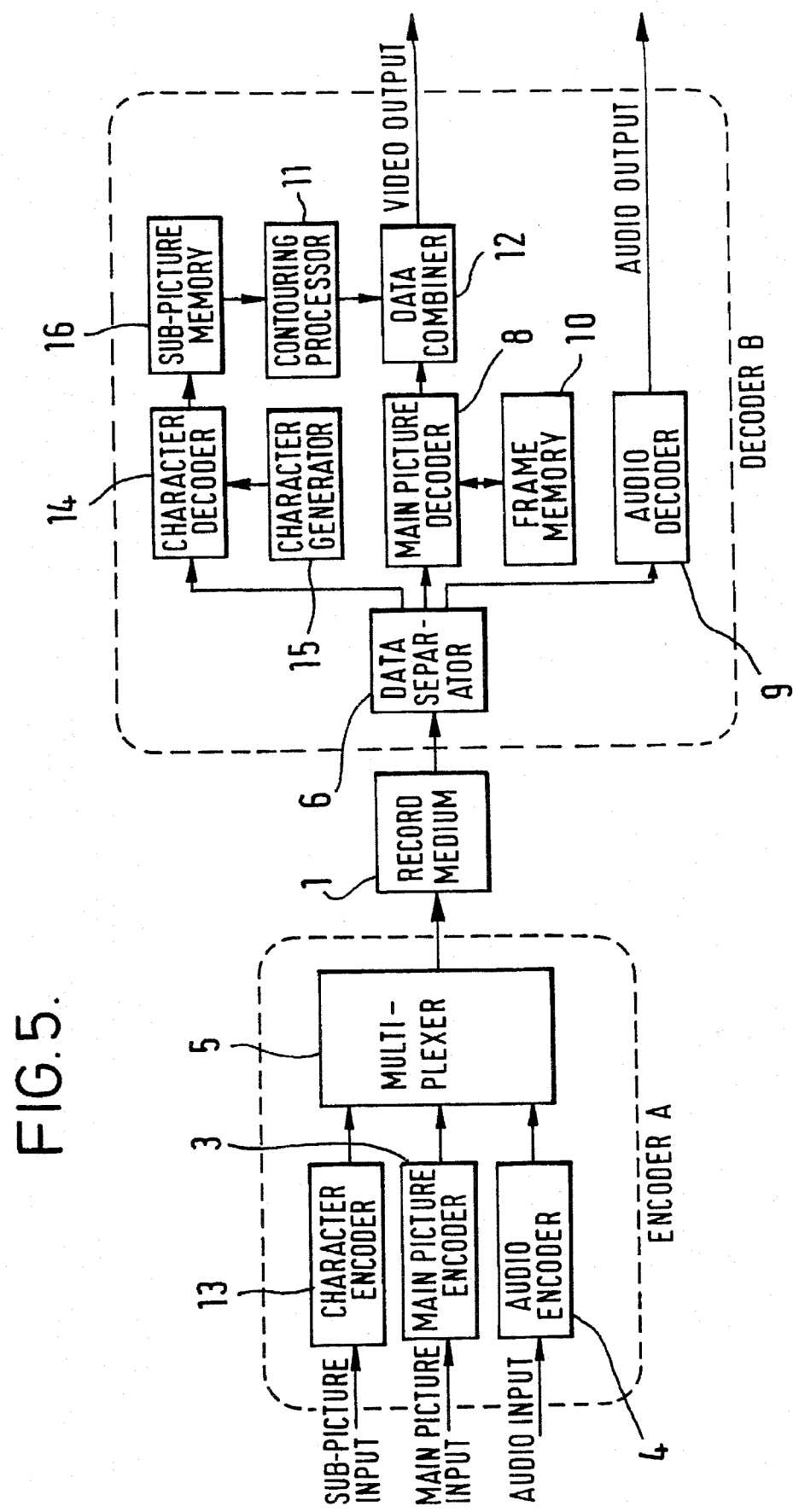
FIG. 5 is a block diagram showing a character image encoding/decoding apparatus according to a second embodiment of the present invention.

FIG. 5 is a block diagram showing a character image encoding/decoding apparatus according to a second embodiment of the present invention. Elements the same as those in the first embodiment, as shown in FIG. 1, will be assigned the same reference numerals. The character image encoding/decoding apparatus in this second embodiment is comprised of an encoder A, a record medium 1 such as a disc, and a decoder B. Reference numeral 13 denotes a character encoder for encoding an input character code according to the run length encoding process. Reference numeral 3 denotes a main picture encoder for encoding an input main picture signal according to the run length encoding process. Reference numeral 4 denotes an audio signal encoder for encoding an input audio signal according to the run length encoding process. Reference numeral 5 denotes a multiplexer which multiplexes the signals encoded by the character decoder 14, the main picture encoder 3 and the audio signal encoder 4 and then outputs the multiplexed signal to the record medium 1 as a record data.

Reference numeral 6 denotes a data separation circuit for separating the signal reproduced from the record medium 1 into the character code, the main picture signal and the audio signal. Reference numeral 14 denotes a character decoder for decoding the character code output from the data separation circuit 6. Reference numeral 8 denotes a main picture decoder for decoding the main picture signal output from the data separation circuit 6. Reference numeral 9 denotes an audio signal decoder for decoding the audio signal and then outputting the audio signal therefrom as audio signals. Reference numeral 10 denotes a frame memory for temporarily encoding main pictures when decoding main pictures in the main picture decoder 8. Reference numeral 15 denotes a character generator for generating character data. Reference numeral 16 denotes a sub-picture memory for temporarily storing the character data which have been decoded by the character decoder 14. Reference numeral 11 denotes a contouring processor for processing the contour of the sub-picture data stored in the sub-picture memory. Reference numeral 12 denotes a data combining circuit for combining the data from the main picture decoder 8 and the contouring processor 11 and outputting them as video signals.

This embodiment will now be explained using a concrete example. In the character encoder 13, a reversible compression processing of input character codes is carried out according to the run length encoding process.

The main picture signals and the audio signals are encoded in the main picture signal encoder 3 and the audio signal encoder 4, respectively, and are multiplexed by the multiplexer 5. The multiplexed signals are recorded as record data on the record medium 1.

The record data reproduced from the record medium 1 is separated into the sub-picture signal, the main picture signal and the audio signal by the data separation circuit 6. The character decoder 14 decodes the encoded character code. The character generator 15 generates additional character codes to be applied to the character decoder 14. Then the additional character codes from the character generator 15 are processed singly or in combination with the character code from the data separation circuit 6. The character code decoded by the character decoder 14 is then stored in the sub-picture memory 16.

The character data output from the sub-picture memory 16 is input to the contouring processor 11. In the contouring processor 11, a character image of the monochromic bit pattern is traced in the horizontal direction to seek changing positions of the bit pattern, as shown by the black dots in FIG. 3. Where the bit-map of the background changes to the bit-map of the character, the last bits on the background are marked as character contour bits through the horizontal direction seek process. Where the bit-map of the character changes to the bit-map of the background, the last bits on the character are marked as the character contour bits through the horizontal direction seek process. In the contouring processor 11, a character image of the monochromic bit pattern is traced in the horizontal direction to find changing positions of the bit pattern, as shown by the black dots in FIG. 3. Where the bit-map of the background changes to the bit-map of the character, the last bits on the background are marked as character contour bits through the horizontal direction seek process. While at the side where the bit-map of the character changes to the bit-map of the background, the last bits on the character are marked as the character contour bits through the horizontal direction seek process.

The character image is then traced in the vertical direction to find the changing positions of the bit pattern, as shown by the black dots in FIG. 4. Where the bit-map of the background changes to the bit-map of the character, the last bits on the background are marked as character contour bits through the vertical direction seek process. Where the bit-map of the character changes to the bit-map of the background, the last bits on the character are marked as the character contour bits through the vertical direction seek process.

According to the horizontal and vertical direction seek processes as described above, it is possible to make a one-bit width contour line along the edge of the character image which originally has a simple shape, as illustrated by the black dot line in FIG. 4.

The contouring processed three-state sub-picture signal is input to a data multiplexing circuit 12 which multiplexes the sub-picture signal with the main picture signal decoded by the main picture decoder 8 and outputs the multiplexed signal as a video output.

The audio signal decoded by the audio signal decoder 9 is directly output from the decoder B as an audio signal output.

In this second embodiment, the additional character image data is generated using the character generator 15. However it is possible to reduce the capacity of a character pattern memory which is built in the character generator 15 by creating a three-state data including contour data from a two-state data in the contouring processor 11.

FIG. 6 is an explanatory diagram showing another example of the character bit-map patterns according to the present invention. In FIG. 6, the blank area 61 with a first character color (white) is used for presenting a character image such as a capital letter A. The double circle dots 62 with a second character color (green) are also used for presenting a character image in place of the first character color (white). So that the second color (green) portion of the character catches the viewer's attention, black dots 63 are used for presenting a block contour line. The single circle dots 64 are used to make the background transparent. Reference numeral 65 represents an offset line of the color changing from the first character color (white) to the second character color (green).

When displaying characters such as lyrics in visual "karaoke" systems on a display screen, it is conventional, to use a different color for the characters to show the current state in the flow of the "karaoke" sounds. In this case, a character changing speed for presenting the current state of the "karaoke" lyrics is made shorter than the updating speed of the character information.

In this embodiment, it is possible to change the character color from the first color (white) to the second color (green) at a speed equal to the frame changing speed of the main picture by detecting the location of the color changing offset line 65.

As described above, the present invention can provide an extremely preferable character image encoding/decoding apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A character image encoding/decoding apparatus comprising:

an encoding portion comprising:

means for encoding character data to a sub-picture with a bit-mapped shape of monochromic character data, separately from an encoding of a main picture; and a decoding portion producing decoded character data and decoded image data comprising:

means for detecting bit changing positions in a two-dimensional manner from the bit-mapped shape of monochromic character data, and processing means for extracting a contour from the character data and developing the character data, the contour and a background of the character data in three domains, respectively, such that the decoded character data and the decoded image data do not require synchronization to be displayed.

2. A character image encoding/decoding apparatus as claimed in claim 1, further comprising:

means for adding control data to the character data, the control data representing a distance from an edge of an image screen to the character data; and means for updating the image screen in consonance with color changes of the character data, according to the control data.

* * * * *